Patented Aug. 9, 1949

2,478,856

UNITED STATES PATENT OFFICE 2,478,856

METHOD OF RECOVERING SURFACE PERMEABILITY OF A POROUS BODY

Wallace W. Beaver, Columbus, Ohio, assignor, by mesne assignments, to Battelle Development Corporation, Columbus, Ohio, a corporation of Ohio No Drawing. Application June 10, 1948, Serial No. 32,273

6 Claims. (Cl. 75—22)

The present invention relates to a method of recovering the surface permeability of strong, ductile, porous, metallic bodies.

Porous metallic bodies which are strong and ductile have many advantages over those which are brittle and hard in that they can withstand sudden shock and rapid changes in pressure and temperature much better and their useful life is much longer than hard, brittle bodies. Unfortunately strong, ductile, porous bodies by their very nature lack frangibility which is a disadvantage in fabricating and ultimate usefulness.

To prepare a large body the usual practice is to form the body by pressureless methods and then sinter under a reducing atmosphere. After sintering, the bodies are then machined to the desired size or shape, to provide for fittings, etc. Large bodies are not generally pressed (briquetted) due to limitations in size of pressing equipment commercially available. Small bodies may be prepared by pressureless methods and given a final machining or by pressure methods with or without a final machining.

It has been found that when these sintered, porous, metallic bodies or castings have been briquetted, coined, machined, or worked, their surface permeability is materially decreased, because during the coining, machining, or working operation, the cutting tool or die will generally drag the ductile metal over the surface pores, resulting in uneven smears of highly cold-worked metal over the surface of the porous body. When the body is formed by briquetting, the metallic particles on the surface of the porous mass will be smeared due to friction between these surface particles and the die walls and plunger when the mass is compressed to shape. It is impossible to overcome this smearing even with the hardest metals and alloys where a ductile and not a brittle body is desired. The reduction in permeability or surface porosity resulting from the smearing action greatly diminishes the effective transmission by the porous metallic body of gases or liquids and greatly reduces its overall efficiency. This loss is particularly important when the porous metallic body is to be used in bearings or units for catalytic processes or any process where its function is to readily absorb, release, control, or mix fluids.

In many instances it is desired to renew the surface porosity insofar as possible and this is particularly true where the porous casting is to be utilized as a fuel mixer or as a filter in order to obtain maximum flow of fluids from the body.

To remove this smeared surface and renew the surface porosity, the usual practice has been to place the machined body in a solution containing an etchant, i. e., a mineral acid or mixture of acids, or alkali, etc., which will attack the smeared particles on the surface of the body. Deep pitting and unevenness results, however, because the surface stresses of the smeared and unsmeared areas are unequal and the etchant will attack these areas at different rates. Thus, it is practically impossible to obtain uniform flow of fluids. Such a body is greatly limited in its usefulness and commercial application.

It is an object of this invention to produce a ductile, porous, metallic body from powdered metal having a surface porosity after briquetting, coining, machining, or working equal to that before being so treated.

It is another object of this invention to provide a method for regaining the original, uniform surface porosity or permeability of a porous metallic body having a smeared surface.

It is a further object of this invention to provide a method for controlling the surface porosity of a sintered, porous metallic body and for obtaining uniform surface permeability.

It has been found that the difficulties alluded to hereinbefore can be overcome by peening the machine smeared surfaces of the porous metallic body, acid etching the peened surface, and finally heating the body in a reducing atmosphere. This method is applicable to any porous bodies having smeared surfaces due to machining and the like.

One of the best methods to obtain a low porosity, pressureless body is to mix a dispersing agent, i. e., alcohol, water, or any other liquid with a low boiling point, and a metallic powder, for example, hard high-melting-point metal. The mixture is then poured into a mold which approximates the final or intended shape of the article. The powder settles by sedimentation and the supernatant liquid is decanted. After decantation, the mold containing the wet powder is allowed to stand so that the low boiling liquid may evaporate. In some cases the mold may be warmed to hasten the evaporation but care must be used so that the evaporating liquid does not produce a high gas pressure which would disrupt the porous mass. Then the powder is sintered to shape in the mold under a reducing atmosphere without the use of any pressure. The sintered porous metallic body is subsequently machined to the desired shape and dimensions.

After machining and before immersing the body in etching solution, the smeared areas on the body are ball or shot peened for a very short time. A homogeneous surface is developed on the surface of the body by shot peening with grit at normal pressures for a very short time. If a very long period of time, i. e., several minutes, is utilized during the shot peening step, distortion of the metallic body will result with a consequent loss of the required precision dimensions. If the entire smeared surface is ball or shot peened prior to etching, pitting of the body in the etching solution is prevented and greater surface porosity is obtained than would be the case if this peening step were omitted. It is desirable to shot peen or blast where there are large, machined bodies only the smeared areas; however, equal success has been obtained by shot peening the entire object. With smaller bodies it facilitates handling to peen the entire body.

If the body were not ball or shot peened prior to etching, the acid in the etching bath would attack the surface areas at different rates, resulting in deep pitting and unevenness, because the smeared and unsmeared areas have different surface stresses. Peening equalizes the surface condition, or the stresses therein, of the smeared and unsmeared areas of the porous body so that each has a high, equal surface stress, permitting the etchant to attack all the metal surfaces at the same rate. If desirable, of course, shot peening may be utilized to cover or mask certain areas which are not needed to absorb or release fluid materials.

By careful control while peening of the grit size, time, and pressure used the surface pores may be partially closed resulting in a body having less surface permeability than theoretically possible with the type of metallic particles used. Since peening changes the surface stresses, it is also possible to peen certain areas for various lengths of time, etc., producing different stresses in the surface areas. These areas will be attacked by the etchant at rates varying with the surface stresses present and resulting in areas having different surface permeability, or different partially reopened surface permeability where the body has been machined. This will be particularly advantageous where the flow of fluids from certain surface areas is required to be different. The step of peening the body is followed by immersing this body in an etching bath. Any particular acids, mixture of acids, or corrosive salts and bases which will etch the metal of which the porous metallic body is made, are suitable. The temperature and concentration of the acid solution depends on the metallic composition of the porous body and the degree of smearing. The corrosive solution now attacks the smeared and unsmeared surfaces of the body at the same rate, because peening has equalized the stresses in the smeared areas with those in the unsmeared areas so that the acid etching step will proceed evenly.

After the porous metallic body has been shot peened and etched, it is then heated in a reducing atmosphere which reduces any metallic salts produced during the etching action to their metallic state, and which then fuse with the porous body. These metallic salts, when reduced in the reducing atmosphere, produce free metal of the same type of which the porous body is made and by fusing or alloying with the porous body tend to strengthen it. Thus, there results a bright metallic body with true dimensions and having great strength and original, uniform surface porosity.

Of course, if it is found desirable, these etching bath salts may be removed entirely by passing water, or any other solution which will not attack the metal of which the body is made, through the body to dissolve the salts and wash them out of the body.

The following example will serve to illustrate the invention in greater detail:

EXAMPLE 1

The machine smeared surface of a large, porous, high strength, sintered, nickel body formed of very fine powder by the pressureless method was shot peened three times for 30 seconds at 40 p. s. i. air pressure using No. 60 grit shot and then its permeability tested. The body was then etched for 30 seconds in a hot acid solution of 50% $HNO_3$ and 50% acetic acid. Immediately after etching and without removing any of the reactants of the acid etching bath, the porous body was placed in a furnace and heated for fifteen minutes at 1500° F. in an atmosphere of hydrogen. The body was again tested for permeability and the steps of acid etching and heating, under a reducing atmosphere were repeated followed by final testing.

The table below shows the results of this experiment during each step expressed in permeability.

*Table A*

| Condition | Permeability, Lbs. of $N_2$/Sec./Square Inch Surface Area per Quarter Inch Thickness at 50 p. s. i. |
|---|---|
| Original sintered porous, nickel body before machining. | $5.0 \times 10^{-4}$ Uniform flow. |
| After machining | $3.3 \times 10^{-4}$ Non-uniform flow. |
| Peening—30 sec., No. 60 grit, 40 p. s. i. | $2.0 \times 10^{-4}$ Uniform flow. |
| Peening—Add. 30 sec., No. 60 grit, 40 p. s. i. | $1.1 \times 10^{-4}$ Uniform flow. |
| Do | $4.0 \times 10^{-5}$ Uniform flow. |
| Etched 30 sec. in an acid bath | $3.0 \times 10^{-4}$ Non-uniform flow. |
| Heated in atmosphere of $H_2$ gas | $4.1 \times 10^{-4}$ Uniform flow. |
| Again etched 30 sec. and again heated in an atmosphere of $H_2$ gas. | $4.7 \times 10^{-4}$ Uniform flow. |

Another example of recovering the surface permeability of a porous body by the method of this invention is found in the following:

EXAMPLE 2

An ingot of 30% Co, 30% Fe, 40% Cu was displaced by centrifuging the Cu out in the molten phase leaving the solid portion essentially 50% Co, 50% Fe, with about 40% voids in the body and residual copper. This was machined to size and had a permeability of $1.14 \times 10^{-3}$ pounds $N_2$/sec./in./¼" at 50 p. s. i. or $2.2 \times 10^{-2}$ pounds $H_2O$/sec./in.$^2$/¼" at 50 p. s. i. After shot blasting with No. 60 grit for 30 seconds at 30 p. s. i. air pressure, etching for 30 seconds with a solution of boiling 50% acetic—50% $HNO^3$, and heating in $H_2$ gas for 15 minutes at 1500° F., the permeability was 0.445 pound $H_2O$/sec. and $8.17 \times 10^{-3}$ pounds $N_2$/sec. With this example the recovery of surface permeability consisted chiefly of the preferential attack on the remaining copper which was easily smeared on machining. The shoe blasting step did not have to be conducted for as long a period of time as shown in single phase bodies (Example 1) where the metal was much harder than copper.

With copper bodies, the acid etching solutions consisted of either 50% $HNO_3$ and 50% $CH_3COOH$, concentrated $HNO_3$ or dilute $HNO_3$. For tungsten bodies a hot solution of KOH or aqua regia proved satisfactory. Molybdenum porous bodies required a hot acid etching solution of 50% conc. HNO₃ and 50% CH₃COOH, or hot conc. HNO₃ alone. Stainless steel bodies required a hot, aqueous solution containing 50% HCl; iron bodies could be satisfactorily etched in cold 50% HCl solution.

Any porous body which is made of a material which can be dissolved by chemical action and in which the permeability has been destroyed by smearing, can be treated in the manner disclosed by this invention to regain the surface porosity and permeability.

In summary, from the hereinbefore described methods, it is readily apparent that this invention provides a unique method of achieving maximum surface porosity of machine smeared, porous metallic bodies made from very fine particles as well as recovery of loss of surface permeability from briquetting, coining, or working any porous metal body by means of peening a porous body to equalize surface stresses before etching the body. This method makes it possible to machine a ductile, porous, metallic body of low porosity to obtain the desired shape and dimensions and also to recover its original, uniform surface permeability without fear of loss of full, uniform permeability. Whereas in the past, in order to obtain full and uniform surface porosity and to prevent smearing, it was necessary to perform long, exacting molding and sintering operations, or to produce very hard, brittle bodies or to carefully grind with special tools. Furthermore, by the method disclosed in this invention it is possible to mask or seal certain areas, as well as to partially close all the surface pores of the body resulting in less surface permeability than is theoretically obtainable with the size particles used. This invention also discloses a method whereby the surface pores may be partially reopened, and whereby areas of varying permeability may be produced.

What is claimed is:

1. A method of improving the surface permeability of a smeared area on a metallic porous body, which comprises peening the smeared area to set up equal stresses throughout, etching the peened area to remove the smeared metal, and finally heating the said body under reducing conditions.

2. The method of producing a porous body which comprises the steps of forming a mixture of metallic powders and a dispersing agent, pouring said mixture into a mold and allowing the powder to settle, decanting the excess liquid in the mold, evaporating the remaining dispersing agent from the mass of metallic powder, sintering the mold and powder mass therein under reducing conditions, removing the sintered, porous body from the mold and machining it, shot peening the machine smeared surfaces of the body, then etching the body, and finally heating said etched body in a reducing atmosphere.

3. A method of recovering substantially the total original and uniform surface permeability of a sintered, ductile, porous body which has smeared surface areas which comprises peening the smeared areas to set up equal stresses throughout the body, placing the body in a solution which will etch the metal of which the body is made, and finally heating said etched body in a reducing atmosphere without removing from the body any of the reactants of the acid etching step.

4. A machined, porous, ductile, metallic body having uniform surface permeability substantially equal to that before machining which was produced by a method, comprising the steps of peening the machine smeared areas of the sintered body to set up equal stresses throughout, placing the body in a solution which will etch the surface of the body, and finally heating the body in a reducing atmosphere.

5. A machined, porous ductile, metallic body having areas of unequal surface permeability which was produced by a method, comprising the steps of peening at different rates various surface areas of a sintered porous body to set up different surface stresses in said areas, then etching the body, and finally heating said body in a reducing atmosphere.

6. A method of producing areas of different surface permeability on a porous, sintered, metallic body which comprises peening various areas at different rates to set up different surface stresses in said areas, etching the peened areas, and finally heating the body under reducing conditions.

WALLACE W. BEAVER.

No references cited.

Certificate of Correction

Patent No. 2,478,856 August 9, 1949

WALLACE W. BEAVER

It is hereby certified that errors appear in the printed specification of the above numbered patent requiring correction as follows:

Column 4, "Table A", in the heading to the second column, line 1 thereof, for "Lbs. of $N_3$/Sec./" read *Lbs. of $N_2$/Sec./*; line 59, same column, for "$HNO^3$" read *$HNO_3$*; line 66, for "shoe" read *shot*;

and that the said Letters Patent should be read with these corrections therein that the same may conform to the record of the case in the Patent Office.

Signed and sealed this 3rd day of January, A. D. 1950.

[SEAL]

THOMAS F. MURPHY,
*Assistant Commissioner of Patents.*